Feb. 12, 1974 D. D. WHITEHURST ET AL 3,791,968
SORBENT FOR REMOVAL OF HEAVY METALS
Filed Dec. 29, 1972 8 Sheets-Sheet 1

FIGURE 4
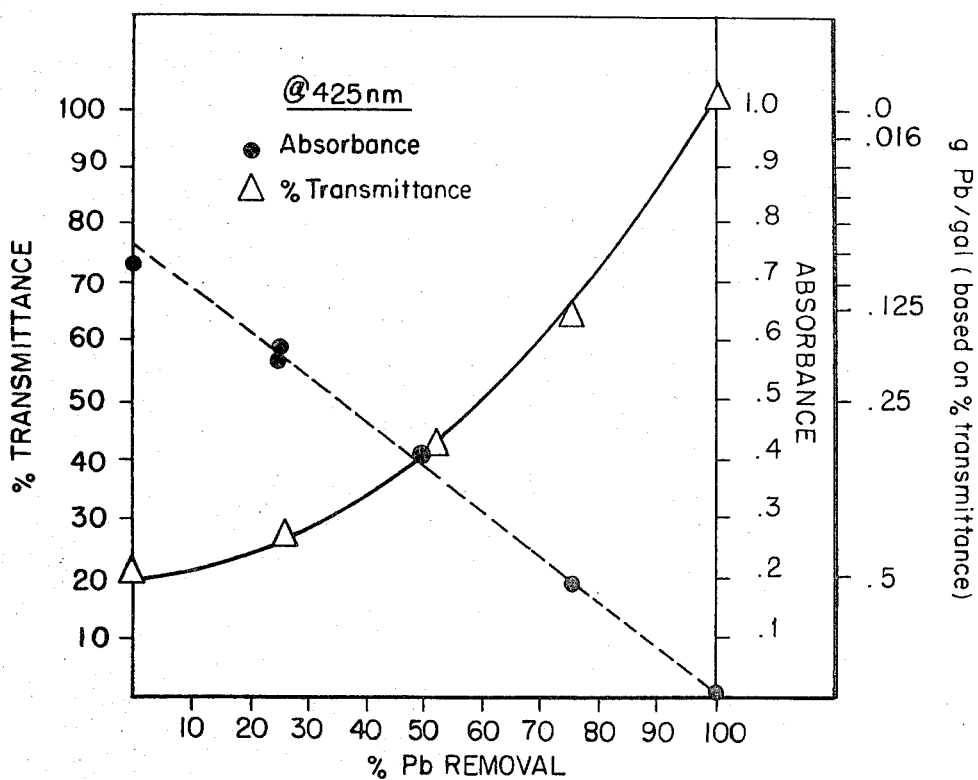
FIGURE 5
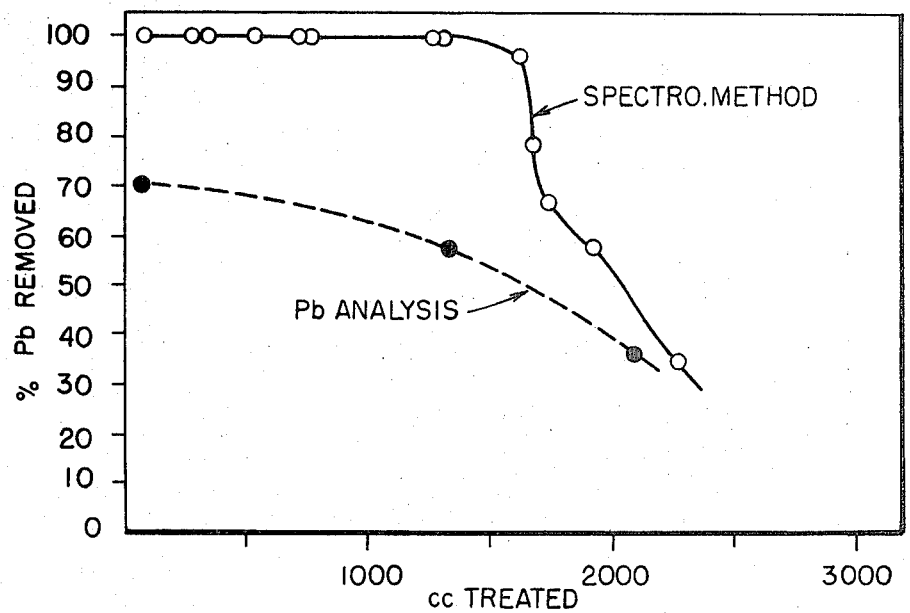
LEAD REMOVAL CAPACITY OF PR-44 (12 LHSV)
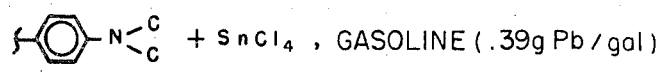

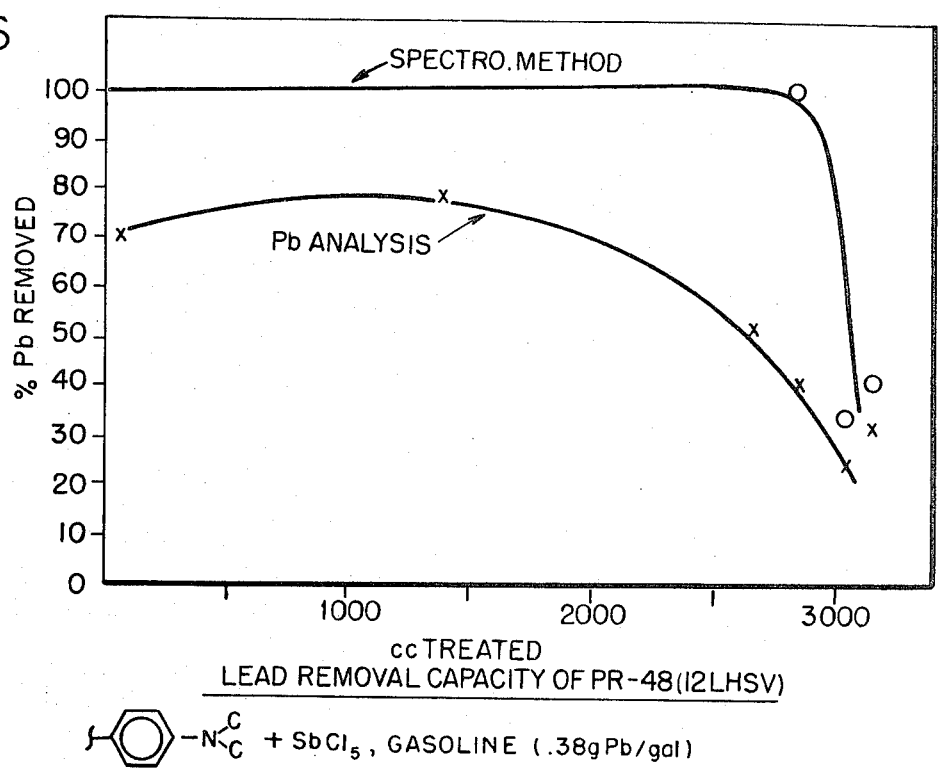
FIGURE 6
LEAD REMOVAL CAPACITY OF PR-48 (12 LHSV)
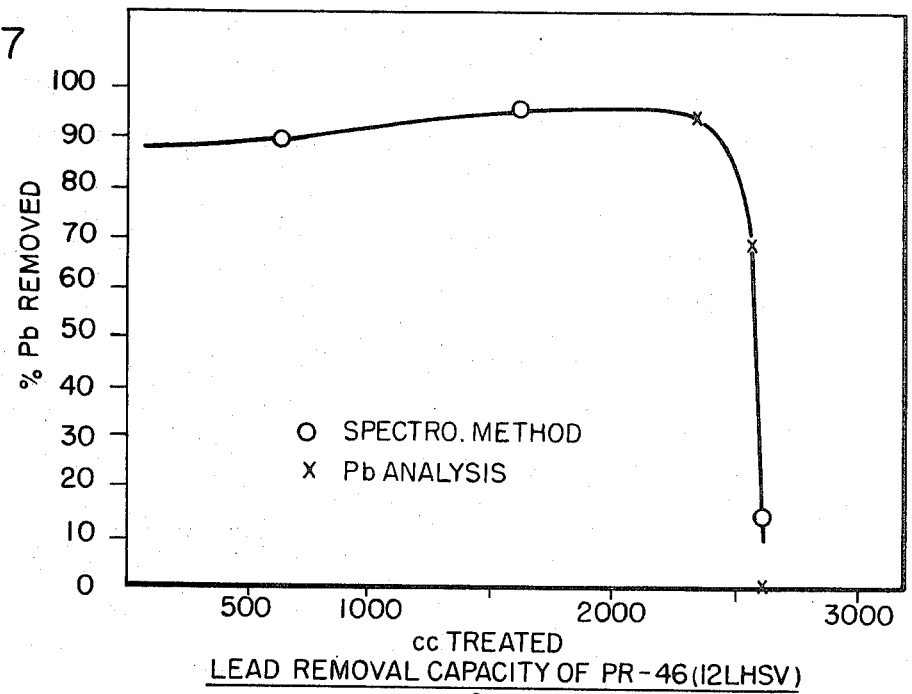
FIGURE 7
LEAD REMOVAL CAPACITY OF PR-46 (12 LHSV)
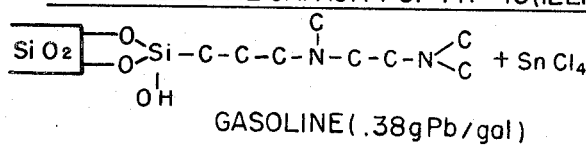

FIGURE 8
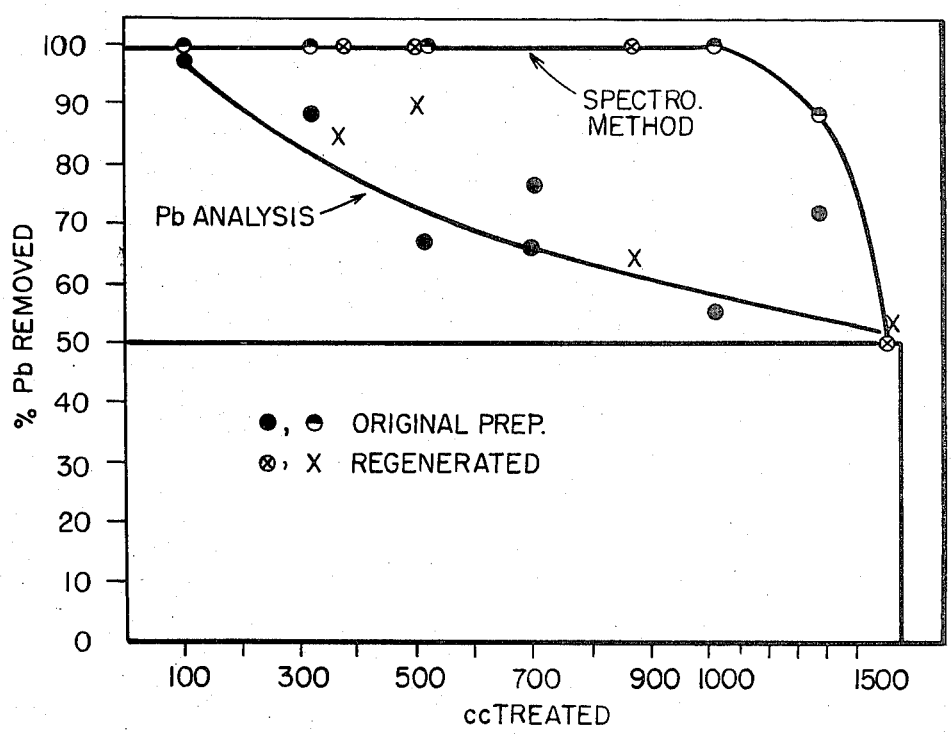
LEAD REMOVAL CAPACITY OF SB-13 (11-13 LHSV)
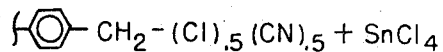
GASOLINE (.33 - .39g Pb/gal.)

Pb CONTENT OF EFFLUENT vs. CONTACT TIME (SnCl$_4$ – ACTIVE HALOGEN RESIN SB–13)

FIGURE 12
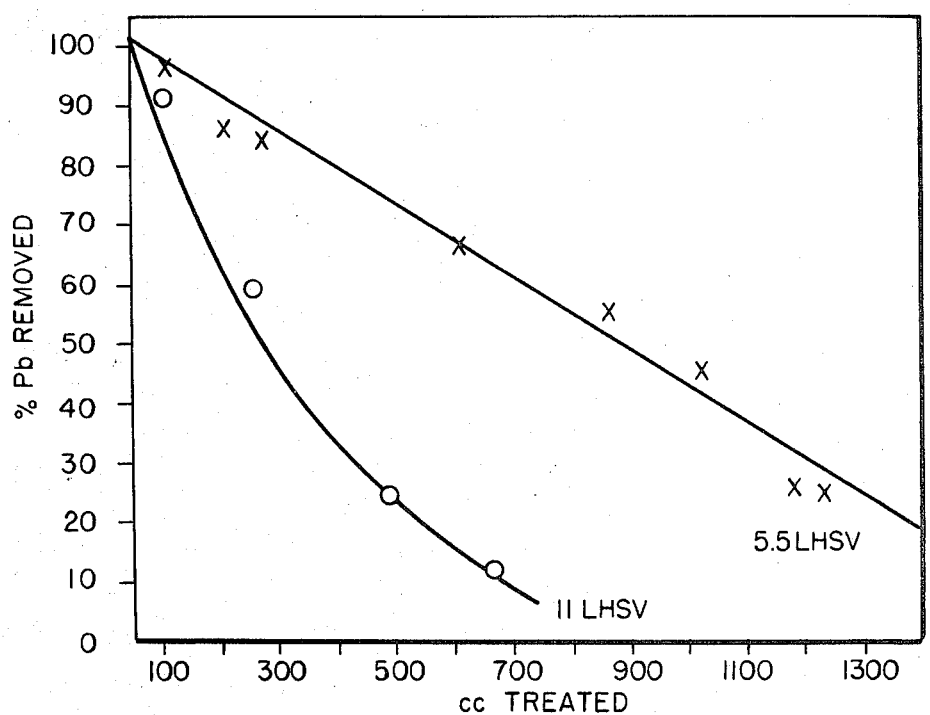
LEAD REMOVAL CAPACITY AND CONTACT TIME
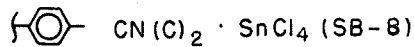 CN(C)$_2$ · SnCl$_4$ (SB-8)
INFLUENT Pb CONC. = 0.33g/gal.

United States Patent Office
3,791,968
Patented Feb. 12, 1974

3,791,968
SORBENT FOR REMOVAL OF HEAVY METALS
Darrell Duayne Whitehurst, Titusville, Stephen Alan Butter, East Windsor, and Paul Gerhard Rodewald, Jr., Rocky Hill, N.J., assignors to Mobil Oil Corporation
Filed Dec. 29, 1972, Ser. No. 319,265
Int. Cl. C10g 17/00
U.S. Cl. 208—251                                   19 Claims

ABSTRACT OF THE DISCLOSURE

A novel use for sorbents involving the selective removal of heavy metals from liquid streams has been discovered. More specifically it has been discovered that these sorbents selectively remove alkyl lead moieties from gasoline. The sorbents are comprised of metal halides (preferably tin tetrachloride or antimony pentachloride) bonded to a suitable substrate through tertiary amine or alkyl halide functional groups. The sorbents can be effectively regenerated.

BACKGROUND OF THE INVENTION

(I) Field of the invention

The invention deals with the removal of metals from compositions containing such metals as organic or inorganic compounds. It more particularly refers to removal of lead from gasoline. The need for the removal of metals is evidenced by the fact that their presence in hydrocarbon charge stocks conducted to catalytic cracking and catalytic reforming process units is known to poison and shorten the life of the catalyst with which such metal contaminated stocks come into contact.

It is also desirable to remove trace metals from lubricating oils or to recover soluble metal catalysts from reactor effluents or polymer solutions. The removal of heavy metals such as mercury, silver, calcium and the like from the water effluents of chemical or photographic plants is also highly desired from an ecological standpoint.

Unburned hydrocarbon, carbon and carbon monoxide emissions are regarded by many as representing a substantial source of air pollution. These engine emissions are subject to photo-chemical reaction in the atmosphere, providing what has been termed smog, which is an irritant of lachrymal and respiratory system tissues.

The incompletely oxidized carbon, e.g. carbon monoxide and unburned hydrocarbons, present in engine exhaust is the result of incomplete combustion of the hydrocarbon fuel in the engine combustion chamber. Complete oxidation of such carbon monoxide and/or hydrocarbons transforms such to carbon dioxide and water, probably in the form of steam due to the high combustion temperature. Neither carbon dioxide nor steam is considered a harmful emission.

Various means have been employed to reduce or eliminate carbon monoxide and unburned hydrocarbon emissions. One approach has been to pass the combustible exhaust gases through a catalytic converter located in the engine's exhaust system where the carbon monoxide and hydrocarbons are catalytically oxidized, usually by the introduction of supplemental air, to carbon dioxide and water.

It is known that residues of alkyl lead from combustion of leaded gasoline tend to poison catalysts available for oxidizing unburned hydrocarbons and carbon monoxide in an engine exhaust. Such poisoning severely shortens the useful life of exhaust combustion catalysts. It has thus been heretofore proposed that "lead free" gasoline be supplied for use in automobiles equipped with emission control devices which utilize catalysts to help further oxidize exhaust gases.

Under most proposals, small, trace amounts of lead would be allowed in "lead free" gasoline. The Federal Government regulations require all gasoline sales outlets to furnish at least one grade of gasoline having less than 0.07 gram of lead per gallon to the public by July 1, 1974. On Feb. 23, 1972 the Environmental Protection Agency in a paper relating to the 1970 Clean Air Act Amendments offered for comment a requirement of 0.05 gram of lead per gallon of gasoline. Other proposals have been even more stringent.

The normal network of petroleum product distribution involves railroad tank cars, pipelines, water borne tankers, tank trucks and bulk storage tanks. For commercial operation these are presently set up to handle different products. For example, the same pipeline might be used to convey a shipment of regular grade gasoline, premium grade gasoline, distillate fuel and other light liquid products in succession. According to present procedures, that portion of the fluids carried by the pipeline which constitutes an intermingling of the two products at their interface is diverted to use with the lower grade product, thus avoiding degradation of the higher grade hydrocarbon.

However when leaded gasoline is followed by lead free gasoline, not just the interface comprising in intermingling of the two products, but the entire lead free shipment becomes degraded. When leaded gasoline, containing tetraethyl lead, tetramethyl lead or a mixture of trans-alkylation products of the two is contacted with the metal or other surfaces of transportation and storage facilities, a significant amount of lead is left deposited in scale and on these surfaces. Since alkyl lead components are infinitely soluble in light hydrocarbons such as gasoline, upon after using the same faculties for lead free gasoline, the latter product becomes contaminated with lead which may run as high as about 0.1 gram of lead per gallon or more. These amounts of lead are sufficient to impair the life or exhaust emission control oxidation catalysts and are in excess of the presently proposed allowable limits on lead content of lead free gasolines.

DESCRIPTION OF THE PRIOR ART

Techniques have heretofore been known for removal of dissolved or suspended heavy metal contaminants from liquid products.

In catalytic cracking and reforming opeartions, the use of guard chambers containing a variety of sorbents and/or catalysts intended to remove heavy metal contaminants from the charge stock before contact is made with the catalyst have been described. Catalytic hydrodesulfurization processes and catalysts remove some amount of heavy metal contamination from hydrocarbon streams processed thereby.

Systems for removal of lead from gasoline have also been proposed. Presently known techniques require considerable time or are non-seelctive in effective removal from the gasoline not only of the lead but also of those additives which are desired to be retained, such as antioxidants, anti-icing additives, metal passivators, detergents and the like.

One previously proposed system for removing lead from gasoline is described in U.S. Pat. 2,368,261. There, acid activated clay, such as bentonite which had been previously treated with hydrochloric or sulfuric acid, is used. Leaded gasoline is percolated through the clay whereby up to 95% of the lead present is removed. Unfortunately, acid activated clays will also remove other gasoline additives which are required or desired for proper protection and functioning of automotive equipment.

Another approach is that described in U.S. Pat. 2,392,-846. According to an example in this patent, a five gallon lot of leaded gasoline is treated with 20 ml. of stannic chloride followed by addition of 100 grams of activated carbon. This results in decomposition of the tetraalkyl lead and adsorption of the lead decomposition products on the activated carbon thus drastically reducing the lead content. The gasoline is removed from the activated carbon by decantation. This is a very slow process which permits the processing of about 35 gallons of gasoline per hour. Unfortunately even in this system, the additives desired to be retained in the gasoline are also adsorbed by the activated carbon.

Both the processes described in the cited prior patents depend for effectiveness on a chemical conversion of the tetraalkyl lead. The lead compounds can be reacted with such materials as halogens, halogen acids, metal halides, metal salts, sulfur dioxide, carboxylic acids, metals in the presence of hydrogen etc. While alkyl leads are infinitely soluble in gasoline, the resulting decomposition products are not readily soluble in hydrocarbons and hence can be selectively adsorbed on high surface adsorbents.

The American Oil Company, in a paper presented at the May 9, 1972 meeting of the API Division of Refining noted that in a significant number of its stations it was presently unable to meet the 0.05 gram/gal. or even the 0.07 gram/gal. requirement using scrutinous control of their distribution system and segregation of products. The area of greatest potential contamination was that of the service station itself. The report would indicate that gasoline manufacturers with distribution systems more extensive than those of American, and relying only on distribution control to ensure that the unleaded gasoline will remain within specifications, face an extremely difficult and expensive undertaking.

It is a primary objective of this invention to provide means to remove heavy metals from liquid, particularly hydrocarbon, streams. It is a further objective of this invention to remove lead alkyls from gasoline. It is an objective of this invention to selectively remove these metals from hydrocarbon streams by such means as will not remove gasoline additives, such as detergent additives, from gasoline streams. It is an objective of this invention to provide for means for removing lead alkyls from gasoline, such means being capable of regeneration. Other and additional objects of this invention will become apparent from a consideration of this entire specification including the claims and drawings.

SUMMARY OF THE INVENTION

In accordance with an in fulfillment of the aforestated objectives, an embodiment of this invention consists of utilizing a sorbent comprising a porous solid substrate having pores with a minimum pore diameter of about 10 A. and a minimum surface area of about 10 m.$^2$/g.; the substrate being modified by at least one functional group of a tertiary amine, alkyl halide or the like which acts as a bridging member between the substrate and at least one metal halide; the metal being a Group I-B, II-B, III-A, IV-A, V-A, VI-A or VIII metal having an atomic member of at least 13, for the removal of heavy metals from non-aqueous liquid solutions, and more particularly for removing lead from gasoline. For purposes of this disclosure, the group designations referred to are as defined in Lange's Handbook of Chemistry of 58–61 (10th ed. 1967). The gasoline is passed through said sorbent at a space velocity of up to 60 LHSV and a temperature of about −50° C. to 100° C.

Halides of the following metals work particularly well; iron (Fe), copper (Cu), silver (Ag), zinc (Zn), cadmium (Cd,) mercury (Hg), aluminum (Al), tin (Sn), lead (Pb), phosphorus (P), arsenic (As), antimony (Sb), bismuth (Bi), sulfur (S), selenium (Se) and tellurium (Te). Those salts having a Lewis acid character exhibited unusually superior results. Furthermore up to a relative concentration of about 70 weak Lewis bases to halogen, improved heavy metal removal was exhibited.

In a preferred embodiment, the metal salts of stannic chloride and/or antimony pentachloride bonded to a substrate having a surface area of at least 10 m.$^2$/g. with pore diameter of at least 10 A. through a tertiary amine bridging member produced an extraordinary ability to remove lead tetraethyl and tetramethyl compounds from gasoline. As illustrated by Table 7, described later in this disclosure in greater detail. A sorbent having a substrate of silica, a metal halide of stannic chloride bonded to the substrate by means of a tertiary amine reduced the lead concentration of gasoline from 0.36 g./gal. to 0.01 g./gal. for 150 bed volumes of operation.

Furthermore, as depicted in Table 9, also described in greater detail later in this disclosure, the sorbent which comprises an embodiment of this invention removes lead moieties and other heavy metals selectively; important and needed additives such as cleansing detergents are not substantially removed while not wishing to be limited by a specific theory of operability, it is believed that the lead removal by the sorbents of this invention may be represented by the following notation:

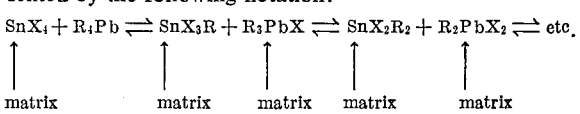

where X is a halogen and R is an alkyl. The above notation and the operation which it represents will be amplified later in the specification, and specifically in the section where the examples are described.

Another embodiment of this invention involves the method of regenerating a sorbent as previously described by means of acid extraction. In the preferred embodiment, a volume of sorbent which is "spent," that is, no longer active for lead removal due to prolonged use, is washed sequentially with about fifteen (15) volumes of benzene, methanol and water. Then about twenty-five (25) volumes of about 20% hydrochloric (HCl) is passed over the sorbent. The acid reacted sorbent is sequentially washed with about fifteen (15) volumes of water and methanol.

Next a metal halide is passed over the acid reacted sorbent in a proportion of about 1:9 metal halide to reacted sorbent, the metal halide being in a solution with a solvent (a preferred solvent is acetone) in a proportion of about 1:15 metal halide to solvent as it is passed over the reacted sorbent. Finally the "regenerated" sorbent is washed with ten (10) volumes of solvent and air dried.

Other embodiments of this invention comprise the system and method of employing the previously described sorbent at any point in a system for distributing and dispensing motor fuels or in an automobile fuel system so as to substantially remove lead.

BRIEF DESCRIPTION OF THE DRAWINGS

FIG. 4 is an analytical curve illustrating amount of lead removal as a function of absorbance and transmittance.

FIGS. 5–8 are curves comparing turbidometric analysis with atomic absorption analysis for four selected sorbents.

FIG. 12 is a set of curves illustrating lead removal capacity as a function of contact time.

DESCRIPTION OF PREFERRED EMBODIMENTS

In a preferred embodiment, the sorbent is placed in a canister in the discharge hose of a service station gasoline pump. This preferred embodiment is more particularly described by making reference to FIGS. 1-3.

Figure 1:
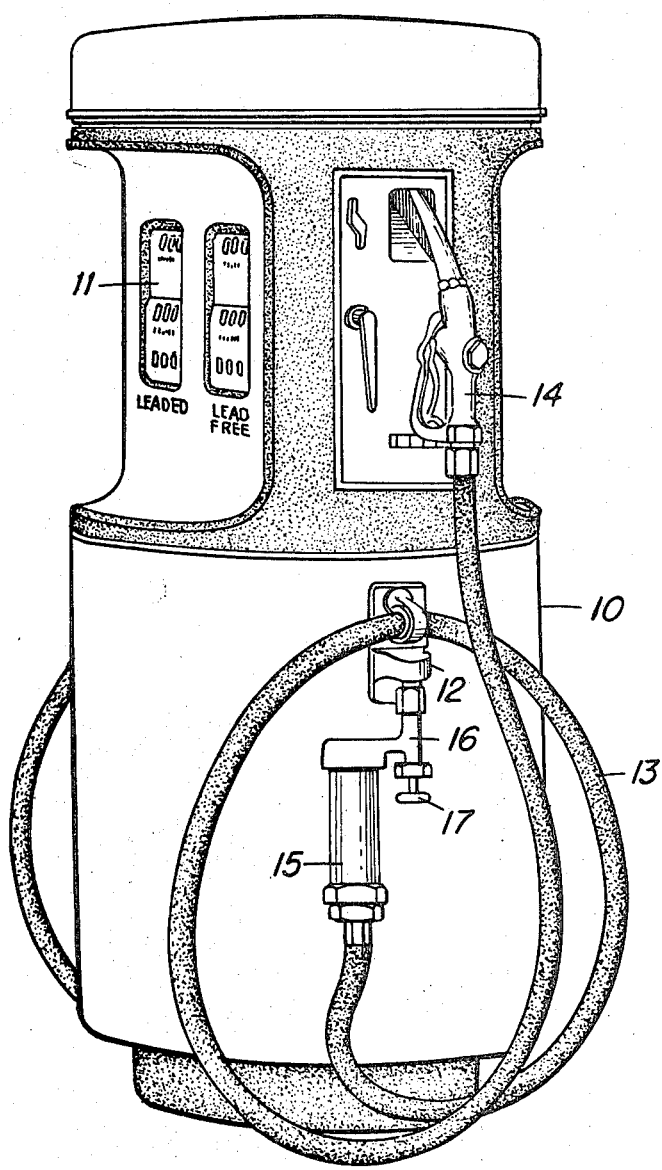
FIG. 1 of the drawings attached hereto represents a typical service station gasoline pump modified according to the present invention.
Figure 2:
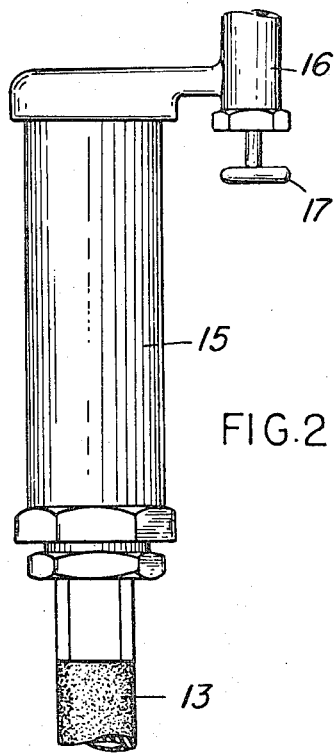
FIG. 2 is an enlarged view of the cartridge for containing the lead removal agent.

As shown in FIG. 1, a gasoline dispensing pump of conventional design includes a housing indicated generally at 10 within which are contained a motor driven pump and a metering device, not shown. The metering device drives, through suitable gearing, indicators within a panel 11 to report gasoline dispensed and price for the amount so dispensed. The fuel after passing through the metering device, is conducted to the outside of the housing through a pipe connection 12 and into a discharge hose 13 equipped with a valve nozzle 14.

The modification to conventional dispensing pumps is a canister 15 connected to the fuel discharge 12 by a pipe 16 provided with a valve for which the operating handle is shown at 17. Fuel from the pipe 16 is conducted to the top of canister 15 containing the lead removal agent from which it passes through a suitably prepared cartridge and is thence discharged to hose 13 and nozzle 14.

Figure 3:
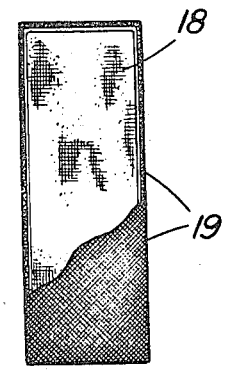
FIG. 3 is a view in fragmentary section of a cartridge for containing the lead removal agent.

A typical cartridge is shown in FIG. 3 as constituted by a gauze container 18 within a wire mesh supporting cage 19. Disposed within the container gauze 18 is a mass of the lead removal agent of the type which characterizes this invention.

For the usual service station, a cartridge having a diameter of about twenty-four inches and length of about twelve inches should be adequate to reduce the lead content to acceptable levels for a working life of about one month. For stations having larger substantially "lead free" gasoline throughput, either the cartridge may be changed more often, or a larger cartridge may be installed between the fuel tank and the dispensing pump. (As previously noted, this disclosure contemplates utilizing the sorbent at any point in a system for distributing and dispensing motor fuels.) Again referring to FIG. 2, when it is desired to change the cartridge, valve 17 is closed, the hose 13 is drained and the canister 15 is removed by unthreading from the top portion thereof. It is thus a simple matter to replace the cartridge in a very short period of time and return the dispensing pump to duty. As previously noted, this invention is to be utilized in non aqueous solutions, as the presence of water limits the performance of the sorbent. Due to the fact that gasoline on occasion containing small amounts of water, it is contemplated that a diliquesent material may be placed in the upstream portion of the cartridge to prevent the sorbent from being rendered of limited performance due to the presence of water.

EXAMPLES 1-8

These tests consisted of contacting approximately three to six volumes of gasoline containing 2.5 grams of lead/gallon of gasoline with one volume of sorbent under ambient conditions, followed by a lead analysis of the contacted gasoline. The period of contact time is noted in the first 5 examples. (The lead analysis after 20 minutes, one hour and three hours roughly correspond to those found under flow conditions at space velocities of 9, 3 and 1 LHSV, respectively.)

Following the contacting of the 2.5 grams of lead/gallon of gasoline fuel with the sorbent prepared as previously described, the lead content of the treated gasoline was analyzed as follows:

A 5 part by volume sample of gasoline was treated with 1 part by volume of a saturated solution of silver nitrate ($AgNO_3$) in absolute ethanol. After standing for ten minutes, the content of reduced silver in the sample was determined by turbidometric technique. These measurements were done at 425 nm. or 500 nm. depending on the gasoline used. The measured transmission was compared with a standard analytical curve similar to the one illustrated by FIG. 4.

TABLE 1

| Example number | Sorbent designation | Sorbent complex | Solvent | Time | Metal removal (percent Pb) | Remarks |
| --- | --- | --- | --- | --- | --- | --- |
| 1 | SB-6 | ⨎―⟨O⟩―$CH_2\overset{CH_3}{\underset{CH_3}{N}}\cdot SnCl_4$ | ETOET | 20 min. 1 hr. | 90 100 | |
| 2 | SB-8 | Same as above | $(CH_3)_2CO$ | 20 min. 1 hr. 2 hr. | 0 45 71 | 3 hr.—66% 1 wk.—100% |
| 3 | SB-9 | ⨎―$N\underset{C}{\overset{C}{\diagup\hspace{-6pt}\diagdown}}\cdot SnCl_4$ acrylic | $(CH_3)_2CO$ | Up to 1 wk. | 0 | |
| 4 | SB-10 | ⨎―⟨O⟩―$C-N\underset{C}{\overset{C}{\diagup\hspace{-6pt}\diagdown}}$ $SnCl_4$ | $(CH_3)_2CO$ | 20 min. 1 hr. 2 hr. | 0 23 95 | 1 wk.—100% |
| 5 | SB-11 | ⨎―⟨O⟩―$CH_2Cl\cdot SnCl_4$ | $(CH_3)_2CO$ | 20 min. 1 hr. 2 hr. | 0 77 94 | 1 wk.—96% |
| 6 | BI | DEAE cellulose·$SnCl_4$ | | | 68 | |
| 7 | PR-65-A | ⨎―⟨O⟩―$N\underset{C}{\overset{C}{\diagup\hspace{-6pt}\diagdown}}\cdot SnCl_4$ ⨎―⟨O⟩―$N\underset{C}{\overset{C}{\diagup\hspace{-6pt}\diagdown}}\cdot SbCl_5$ | o-Dichlorobenzene | 1 hr. | 100 | |
| 8 | PR-65-B | ⨎―⟨O⟩―$CH_2Cl\cdot SnCl_4$ ⨎―⟨O⟩―$CH_2Cl\cdot SbCl_5$ | do | 1 hr. | 100 | |

Comparison of Example 3 with the other examples results tabulated in Table 1 gives an indication of the importance of the substrate surface area. The acrylic substrate used in Example 3 had a surface area substantially lower than the other substrates used, and as the results indicate, the lead removal ability of the sorbent formed with it was substantially lower than the other examples.

It is contemplated that substrates of the type described in this disclosure include spent cracking catalysts and inorganic oxides such as clays and pumice.

EXAMPLES 9–12

Metal halides having Lewis acid character were attached to various substrates as noted in Table 2.

The table also indicates the solvent used during metal halide incorporation and the volume of gasoline passed over 10 parts by volume of sorbent while still maintaining at least 50% removal of the initial lead at 11–13 LHSV.

The leaded gasoline to be treated was passed over the sorbent under the following continuous flow conditions: The general procedure involved passing volumes of about 0.4 gram of lead/gallon of gasoline fuel through a 10 part by volume quantity of resin supported on a glass frit. The flow rates were controlled by varying the percent of stroke on a variable displacement pump, while a 1 to 2 part by volume gasoline hydraulic head was maintained above the resin by a fine adjustment stopcock.

The sorbents utilized in Examples 9–12 were analyzed in a manner similar to the procedure described in Examples 1–8.

TABLE 2.—PERFORMANCE OF VARIOUS METAL HALIDE REDISTRIBUTION REAGENTS IN LEAD REMOVAL FROM GASOLINE

| Example number | Sorbent designation | Sorbent [a] | Metal halide | Solvent used during metal halide incorporation | $V_{1/2}$ (cc./10 cc. sorbent) [b] |
|---|---|---|---|---|---|
| 9 | PR-30 | ∫—⟨O⟩—$CH_2(Cl)_{.9}(CN)_{.1}$  EGDM | $SnCl_4$ | Acetone | 1,200 |
| 10 | PR-34 | Same as above | $SbCl_5$ | Benzene | 1,400 |
| 11 | PR-44 | ∫—⟨O⟩—N(C)(C)  DVB | $SnCl_4$ | Acetone | 1,600 |
| 12 | PR-48 | Same as above | $SbCl_5$ | Chloroform | 2,700 |

[a] Subscript denotes crosslinking agent. EGDM=Ethylene glycol dimethacrylate. DVB=Divinylbenzene.
[b] Capacity at LHSV=10–13.

EXAMPLES 13–19

A number of sorbents containing tin chloride ($SnCl_4$) or antimony pentachloride ($SnCl_5$) were analyzed for TABLE 3.—TIN RETENTION AND LEAD PICKUP BY VARIOUS SORBENTS CONTAINING $SnCl_4$

| Example number | Sorbent designation | Sorbent matrix | Weight percent | | | Volume pf.[1] 0.33–0.39 g.p.b./gal. gasoline deleaded (cc./10 cc. sorbent) |
|---|---|---|---|---|---|---|
| | | | Sn, initial | Sn,[1] final | Pb,[1] final | |
| 13 | SB-11 | ∫—⟨O⟩—$CH_2Cl$ (DVB) | .22 | .07 | .02 | 343 |
| 14 | SB-21 | ∫—⟨O⟩—$CH_2Cl$ (EGDM) | 1.32 | .8 | .04 | 665 |
| 15 | SB-8 | ∫—⟨O⟩—C—N(C)(C) (DVB) | 11.4 | 12.2 | .04 | 1,240 |
| 16 | SB-13 | ∫—⟨O⟩—$C(Cl)_{.5}(CN)_{.5}$ (EGDM) | 2.61 | 2.45 | 1.4 | 2,142 |
| 17 | PR-44 | ∫—⟨O⟩—N(C)(C) (DVB) | 7.1 | 2.91 | 1.2 | 2,294 |
| 18 | PR-46 | $SiO_2$—O—Si(OH)—C—C—N(C)—C—C—N—C | 4.3 | 3.6 | 2.8 | 2,626 |
| | | | Sb, initial | Sb, final | | |
| 19 | PR-48 | ∫—⟨O⟩—N(C)(C) (DVB) | 14.0 | 14.6 | .28 | 3,144 |

[1] All runs were terminated shortly after the sorbent no longer removed >20% of the lead (~.4 g./gal.) at LSHV=11–13.

tin or antimony content before and after processing a gasoline of about 0.4 gram of Pb/gallon of fuel. The lead content of the used sorbents was also determined by chemical analysis, and the results summarized in Table 3 above. The gasoline flow conditions were identical to those described in Examples 9–12.

moval by the sorbents in general paralleled the volume of gasoline processed in which 20% of the lead was removed. In Example 18 nearly 3% by weight lead was incorporated into the sorbent. At such a high level of lead, its recovery by acid extraction would appear to be economically feasible.

of halogen to nitrile; swelling of the sorbent after nitrile modifying treatment and stannic chloride addition; the weight percentage of tin incorporated with the sorbent; and the volume of gasoline passed over 10 volumes of the treated sorbent until 50% of the initial lead (0.4 gm./

TABLE 4.—SORBENT EFFICIENCY OF SnCl₄ PLUS BENZYL HALIDE CONTAINING POLYMERS

| | | | | Mole percent remaining of original: | | Swelling (Δcc./gm.) | | Wt. percent Sn⁺⁺ in-corporated | Vol 1/2 LHSV— 11–13 | Percent Sn efficiency |
|---|---|---|---|---|---|---|---|---|---|---|
| Sorbent designation | Base resin number | Cross linking agent | Modifying treatment | Wt. percent Cl in original | Percent –⟨◯⟩–CH₂–Cl | Percent –CH₂–X (X=CN) | Treatment | SnCl₄ | | | |
| Example number: | | | | | | | | | | | |
| 20 | SB-11 | 5 | E¹ | None | 11.2 | 100 | | 0 | 0 | | | |
| 21 | SB-21 | 4 | D | do | 20.0 | 100 | | .65 | .05 | .22 | 150 | 28 |
| 22 | PR-30 | 2 | E | KCN/H₂O (58° C.), 16 hr | 20.0 | 100 | 10 | .42 | .05 | 1.32 | 500 | 19 |
| 23 | SB-13 | 2 | E | NaCN/H₂O (warm), 16 hr | 17.1 | 90 | 50 | .45 | .35 | 2.5 | 1,200 | 32 |
| 24 | PR-36 | 1 | E | KCN/DMSO (50° C.), 16 hr | 20.0 | 50 | 80 | | | 2.61 | >2,000 | >43 |
| 25 | SB-13R | 1 | E | SB-13 regenerated | 20.0 | 50 | 50 | | | 1.50 | 700 | 28 |
| 26 | PR-32 | 2 | E | KCN/H₂O (40° C.), 72 hr | 20.0 | ~100 | | .28 | | | 1,600 | Low |
| 27 | PR-39 | 3 | E | NaOH/H₂O (50° C.), 16 hr | 18.4 | 100 | | | | | 230 | Low |
| 28 | PR-33 | 2 | E | Sonicated (125 w.), 10 min | 20.0 | | | | .58 | | 300 | Low |
| 29 | | | | | | | | | | | 300 | Low |

¹ Gel.
Note.—E is ethylene glycol dimethylacrylate; D is divinylbenzene.

tical to those described in the procedure recited in Examples 9–12.

Those sorbents which efficiently removed lead and had large capacities in general showed little or no loss of tin or antimony to the processed gasoline. Lead re-

EXAMPLES 20–29

A class of sorbents with tin chloride in combination with active halogen was further modified by the addition of weak Lewis bases (nitriles). The relative concentration gal.) at 11–13 LHSV could no longer be removed were measured and summarized in Table 4. The gasoline flow conditions were identical to those described in the procedure recited in Examples 9–12.

EXAMPLES 30-39

The tin distribution in a number of sorbent matrices was determined by electron microprobe techniques; leaded gasoline was passed over a 10 part by volume sample of each sorbent until the sorbent was no longer able to remove 50% of the initial lead concentration (0.4 gm./gal.) at 11-13 LHSV according to the flowing test procedure recited in Examples 9-12; and finally the lead distribution in the sorbent was determined by microprobe techniques. The percent tin efficiency, that is the percent of the original tin which operated to remove lead, was calculated for each sorbent.

Table 5 illustrates the physical properties or characteristics of various sorbents all of which contained tin chloride ($SnCl_4$). The table shows the amount of tin (Sn) initially deposited on each sorbent, and the uniformity of the distribution throughout the sorbent.

TABLE 5.—SORBENT EFFICENCY AND PHYSICAL PROPERTIES OF SELECTED $SnCl_4$ CONTAINING MATRICES

| | Example number | | |
|---|---|---|---|
| | 30 | 31 | 32 |
| | Tertiary amine series | | |
| Sorbent designation | SB-8 | PR-44 | PR-46 |
| Sorbent matrix | [structure] | [structure] | [structure] |
| Surface area (m.²/gm.) | ~30 | 67 | 340 |
| Swelling ª (Δ cc./g.) | | .48 | ~0 |
| Density, found (g./cc.) | | .55 | .4 |
| Density, calculated (g./cc.) | .53 | .57 | .41 |
| Pore volume, cc./g | .6 | .6 | 1.16 |
| Percent pore size dist.: | | | |
| >300 A | | | 8.5 |
| 300-100 A | Major | Major | 59.3 |
| 100-50 A | | | 32.2 |
| <50 A | | | Small |
| Percent: | | | |
| Sn | 11.4 | 7.1 | 4.3 |
| Cl ᵇ | 6.2 | | |
| X ᵇ | [5.32]ₙ | [3.28]ₙ | [0.5]ₙ |

| Sorbent designation | SB-11 | SB-21 | SB-13 |
|---|---|---|---|
| Sorbent matrix | [structure] DVB | [structure] EGDM | [structure] EDGM |
| Surface area (m.²/gm.) | <5 | 19 | 20 |
| Swelling ª (Δ cc./g.) | | .65 | .45 |
| Density, found (g./cc.) | | | .63 |
| Density, calculated (g./cc.) | .74 | .74 | .74 |
| Pore volume, cc./g | .1-.3 | .207 | 2.04 |
| Percent pore size dist.: | | 94.2 | 94.9 |
| >300 A | | 1.5 | 0.3 |
| 300-100 A | Major | 4.2 | 4.8 |
| 100-50 A | | | |
| <50 A | | | |
| Percent: | | | |
| Sn | .22 | 1.32 | 2.61 |
| Cl ᵇ | [11] | [21] | [9.7] |
| X ᵇ | | | |

| | Example number | | |
|---|---|---|---|
| | 33 | 34 | 35 |
| Sorbent designation | SB-8 | PR-44 | PR-46 |
| Sn distribution (fresh) ᵉ | | U | U |
| Pb distribution (used) ᵈ | | U | U |
| Initial percent Pb removal/pass | ~90 | 80 | 95 |
| Vol₁/₂ ᵉ (cc.) | 300 | 1,600 | 2,400 |
| Moles Sn/10 cc. sorbent | 5.51 | 3.43 | 1.49 |
| Moles Pb removed at vol₁/₂ | .08 | .54 | 1.00 |
| Percent Sn efficiency ᶠ | 1.5 | 16 | 67 |

| Sorbent designation | SB-11 | SB-21 | SB-13 |
|---|---|---|---|
| Sn distribution (fresh) ᵉ | S (11%) | S (10%) | S (14%) |
| Pb distribution (used) ᵈ | (U-S) | (U-S) | (U-S) |
| Initial percent Pb removal | 90 | 90 | 85 |
| Vol₁/₂ ᵉ (cc.) | 150 | 500 | >2,000 |
| Moles Sn/10 cc. sorbent | .14 | .83 | 1.64 |
| Moles Pb removed at vol₁/₂ | .04 | .16 | >.71 |
| Percent Sn efficiency ᶠ | 29 | 19 | >43 |

ª Determined for non-Sn containing sorbents, gasoline solvent.
ᵇ Bracketed numbers refer to the sorbent matrix prior to Sn incorporation.
ᶜ S (11%)=shell distribution, the depth of the shell=(11%) of the radius from the exterior surface inward; U=uniform distribution.
ᵈ (U-S)=uniform distribution in the center portion of the particle where Sn was not found.
ᵉ Volume of gasoline passed over 10 cc. of sorbent while still maintaining at least 50% removal of the initial Pb (.4 g./gal) at 11-13 LHSV.
ᶠ The percent of the original Sn which operated efficiency in removing lead.

EXAMPLES 36-39

Four sorbents were tested at LHSV 11-13 under the flowing test procedure recited in Examples 9-12. Under these conditions the lead removal was high, generally above 80%. The treated gasoline was tested to determine its nitrogen component concentration to determine the amount of indigenous basic nitrogen compounds in gasoline removed during the lead removal process. A separate analysis of a detergent additive was also made. Results are shown in Table 6.

Examples 36-39 were tested at space velocities ranging from 11-40 LHSV. The solvents were tested by passing 75-150 bed volumes of leaded gasoline over each sorbent and measuring the lead content of the gasoline before TABLE 6.—THE EFFECT OF LEAD REMOVAL ON THE NITROGEN AND NITROGEN BASED DETERGENT CONTENT OF GASOLINE

| | Example number | | | |
|---|---|---|---|---|
| | 36 | 37 | 38 | 39 |
| Sorbent | SB-13 | PR-44 | PR-48 | PR-46 |
| Substrate | $CH_3-(Cl)_{.5}(CN)_{.5}$ | (nitro-benzene type) | (nitro-benzene type) | $[SiO_2]$ Si-O-OH/O-C-C-C-N-C-C-N-C |
| Metal halide | $SnCl_4$ | $SnCl_4$ | $SbCl_5$ | $SnCl_4$ |
| "N" content (p.p.m.) | 12 / 2.0 / 3.0 / 3.0 / 6.9 | 13 / 4.5 / 5.7 / 6.7 | 14 / 3.6 / 3.5 / 5.1 / 6.2 | 14 / 3.1 / 4.2 / 7.9 |
| Parts by volume, fuel processed | Original / 375 / 500 / 870 / 1,570 | Original / 78 / 1,364 / 1,918 | Original / 80 / 1,394 / 2,680 / 3,034 | Original / 722 / 1,614 / 2,626 |
| | Removal in 1st 400 parts by volume. | Removal in 1st 400 parts by volume. No removal. | Removal in 1st 400 parts by volume. No removal. | Detergent Removal in 1st 400 parts by volume.[1] 33% removal. |
| | Detergent Removal after 400 parts by volume. | Detergent | Detergent | |

[1] No removal after 400 parts by volume.

NOTE:
a. Original content was 248/1,000 bbl. or 3.6 p.p.m. "N".
b. In all cases 10 parts by volume of sorbent was used to remove the lead at 11-18 LHSV.

EXAMPLES 40-46

Four sorbents, similar or identical to those tested in and after treatment. The initial lead concentration was varied from 0.10 to 0.39 gram of lead per gallon of gasoline. The results of the test are shown in Table 7.

TABLE 7

| Sorbent | Example number | Space velocity | Lead concentration, g./gal. Feed | Lead concentration, g./gal. Product a |
|---|---|---|---|---|
| SiO₂ ]–O–Si(OH)(O–)–N(C)–N(C)(C) + SnCl₄ | 40 | 12 | .36 | .01 |
|  | 41 | 40 | .36 | .01 |
| ∫–⟨O⟩–N(C)(C) + SnCl₄ | 42 | 13 | .36 | .16 |
| Same as above | 43 | 11 | .10 | b.04 |
| Do | 44 | 28 | .10 | b.02 |
| ∫–⟨O⟩–N(C)(C) + SbCl₅ | 45 | 13 | .38 | .07 |
| ∫–⟨O⟩–CH₂Cl(CN) + SnCl₄ | 46 | 13 | .39 | b.11 | a Lead analysis after 150 bed volumes except as noted.
b After 75 bed volumes.

EXAMPLE 47

A cyanide-treated chloromethylated polystyrene resin (sorbent designating SB–13) which had been promoted with stannic chloride, and which had been rendered inactive by satisfactorily treating over 200 volumes of leaded gasoline (0.33–0.39 gram/gal.), was washed with portions of benzene, methanol and water. 250 volumes of 20% hydrochloric acid was then passed over the resin which was next washed with 250 volumes water, methanol and finally air-dried. Two volumes of stannic chloride in 30 volumes of acetone was then passed over the resin, followed by 100 volumes of acetone; the resin was then dried in air.

Figure 9:
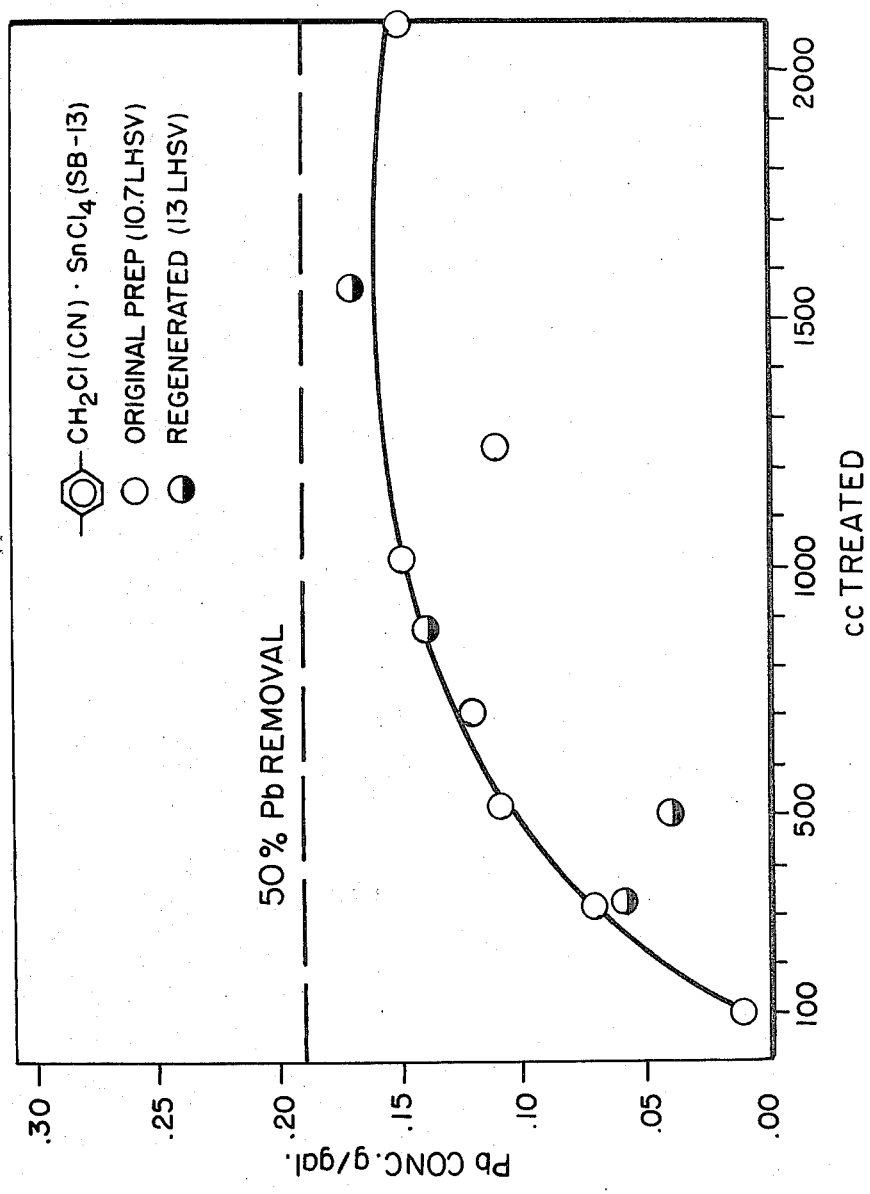
FIG. 9 is a set of curves illustrating lead concentration as a function of volume of leaded gasoline treated.
Figure 10:
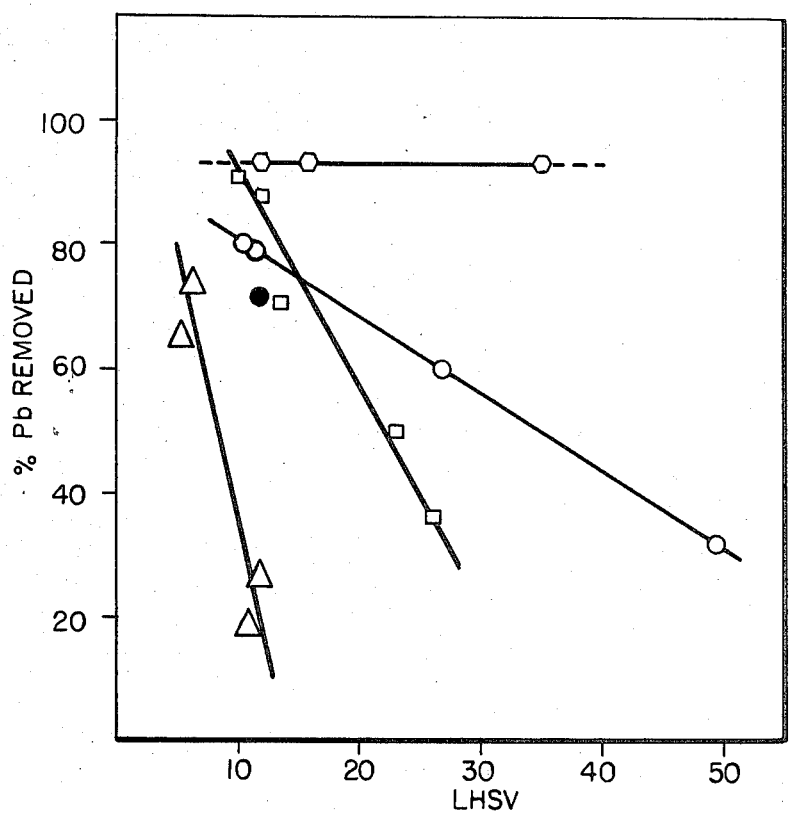
FIG. 10 is a series of curves illustrating lead removed as a function of flow rate.

This regenerated sorbent was again used to remove lead from gasoline leaded to a 0.33–0.39 gm./gal. level. The results of the lead removal capability of the regenerated sorbent are plotted in FIG. 9.

EXAMPLES 48–51

A gasoline having a lead level of 0.36 gram/gallon was diluted with a very low lead level gasoline until the mixture's lead level was reduced to 0.10 gram/gallon. Four sorbents were then tested at varying LHSV ranging from about 5 to 50 under the flowing test procedure recited in Examples 9–12. The response of the low lead gasoline to space velocity variation was consistent with the results at higher lead levels. The efficiency of sorbent designated as PR–44 was compared at two different lead levels (0.36 gram of lead/gallon and 0.10 gram/gal.). As noted in FIG. 7, the efficiencies were substantially identical.

EXAMPLE 52

Figure 11:
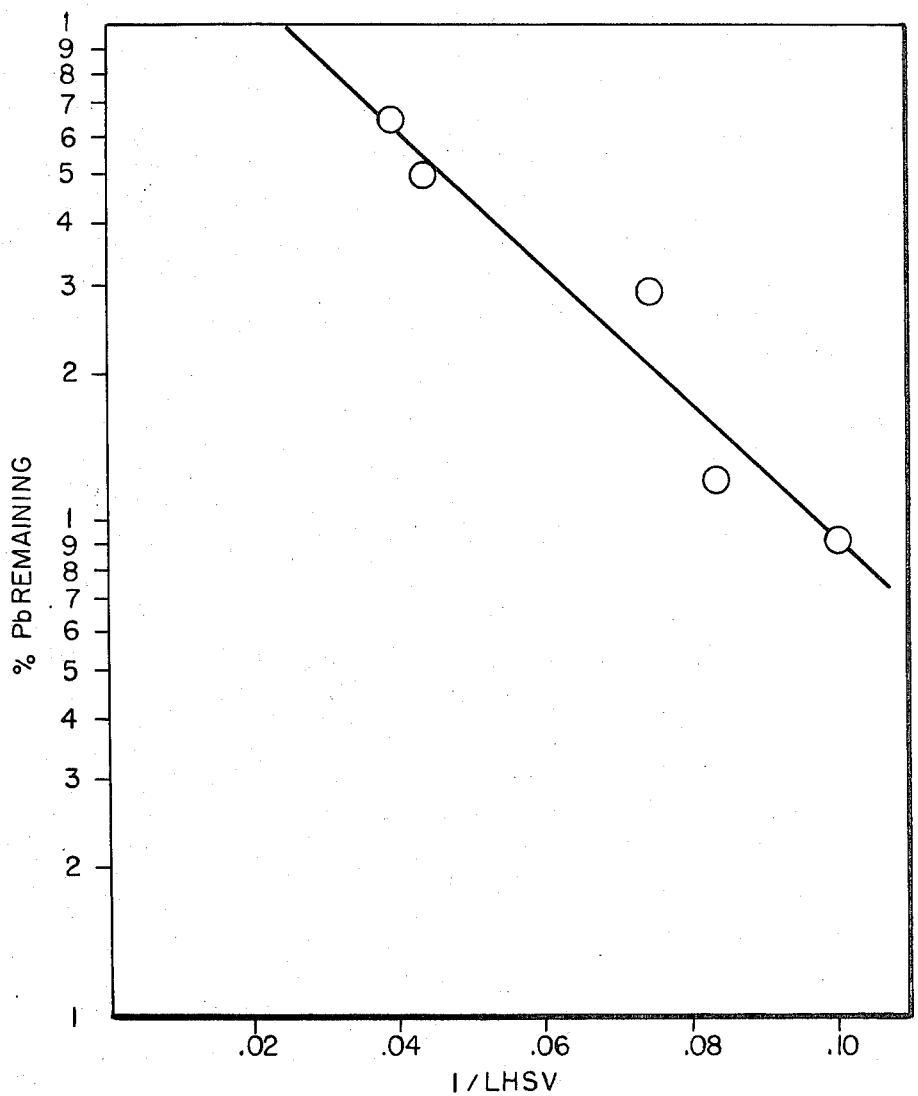
FIG. 11 is a curve illustrating lead content of effluent as a function of contact time.

The sorbent designated SB–13 was subjected to the gasoline flowing conditions recited in Examples 9–12. The gasoline had a lead concentration of about 0.4 gm./gal., and the space velocity was varied from approximately 10 to 50 LHSV. The lead removal ability of the sorbent at the various space velocities was determined by atomic absorption analysis; the results are plotted on FIG. 11.

EXAMPLE 53

The sorbent designated SB–8 was subjected to the gasoline flowing conditions recited in Examples 9–12. The gasoline had a lead concentration of about 0.4 gram/gallon, and the sorbent was tested at space velocities of 5.5 and 11 LHSV. The lead removal capability of the SB–8 sorbent at the two space velocities was determined after various volumes of gasoline had been passed over the sorbent through the use of atomic absorption analysis; the results are plotted on FIG. 12.

What is claimed is:

1. A method for effecting removal of heavy metal contaminants from a substantially hydrocarbon solution containing the same which comprises contacting said solution with a sorbent for said metal contaminants comprising a substrate having a minimum surface area of about 10 m.²/g. and having pores with a minimum pore diameter of about 10 A.; said substrate being modified by an alkyl halide functional member; said substrate being further modified by at least one metal halide, the metal of said metal halide being a Group I–B, II–B, III–A, IV–A, V–A, VI–A or VIII metal having an atomic number of at least 13, said functional member acting as a bridging member between said substrate and said metal halide, and removing said solution having a significantly lower heavy metal moiety concentration.

2. The method as claimed in claim 1 wherein said metal is selected from the group consisting of Fe, Cu, Ag, Zn, Cd, Hg, Al, Sn, Pb, P, As, Sb, Bi, S, Se and Te.

3. The metal as claimed in claim 2 wherein said metal halides have a Lewis acid character.

4. The method as calimed in claim 3 wherein said heavy metal contaminants are lead alkyl moieties and said substantially hydrocarbon liquid solution is gasoline and said contacting is carried out at about —50° C. to 100° C. and at space velocities of up to about 60 LHSV.

5. The method as claimed in claim 4 wherein said metal halide is tin tetrachloride.

6. The method as claimed in claim 4 wherein said metal halide is antimony pentachloride.

7. The method as claimed in claim 4 wherein said substrate is an oxide of at least one of the elements selected from the group consisting of B, Bi, Al, Si, Ga, Sn, Ti, Zr, V, Cr, Mo, W, Mg and Fe.

8. The method as claimed in claim 7 wherein said element is Al.

9. The method as claimed in claim 7 wherein said element is Si.

10. The method as claimed in claim 7 wherein said element is Ti.

11. The method as claimed in claim 7 wherein said sorbent is further modified by the addition of nitriles having weak Lewis base character.

12. The method as claimed in claim 9 wherein said oxide is SiO₂.

13. In a process for distributing and dispensing motor fuel comprising transportation means and storage means used alternatively for leaded and unleaded fuels and at least one substantially lead-free fuel dispensing station comprising storage means; pumping means; conduit means connecting said storage means and said pump; and conduit discharge means from said pump; the improvement which comprises contacting said fuel with a sorbent comprising a substrate having a minimum surface area of about 10 m.$^2$/g. and having pores with a minimum pore diameter of about 10 A., said substrate being modified by an alkyl halide functional member; said substrate being further modified by at least one metal halide, the metal of said metal halide being a Group I-B, II-B, III-A, IV-A, V-A, VI-A or VIII metal having an atomic number of at least 13, said functional member acting as a bridging member between said substrate and said metal halide, said contacting being carried out at about −50° C. to 100° C. and at space velocities of up to about 60 LHSV.

14. The process as claimed in claim 13 wherein said metal halides have Lewis acid character.

15. The process as claimed in claim 14 wherein said metal halide is tin tetrachloride.

16. The process as claimed in claim 14 wherein said metal halide is antimony pentachloride.

17. The process as claimed in claim 14 wherein said sorbent is located in said pump discharge means so that said fuel passes through said sorbent as it is pumped.

18. The process as claimed in claim 17 wherein a deliquescent material is located upstream of said sorbent to effect water removal.

19. A method of regenerating a lead removal sorbent comprising a porous substrate bonded to a metal halide by means of an alkyl halide functional member, said method of regeneration comprising washing sequentially a spent sorbent, that is, one no longer active for lead removal due to prolonged use, with about fifteen volumes of benzene, methanol and water; passing about twenty-five volumes of 20% hydrochloric acid over said spent sorbent; washing sequentially said acid reacted sorbent with about fifteen volumes of water and methanol; passing a metal halide over said sorbent in a proportion of about 1:5 metal halide to sorbent, said metal halide being in solution with a solvent in a proportion of about 1:15 metal halide to solvent as it is passed over the sorbent; washing said sorbent with ten volumes of solvent, and drying said sorbent.

References Cited
UNITED STATES PATENTS

| | | | |
|---|---|---|---|
| 2,392,846 | 1/1946 | Friedman | 208—253 |
| 3,105,038 | 9/1963 | Ayers | 208—251 |
| 2,745,793 | 5/1956 | Jezl et al. | 208—251 |
| 2,448,235 | 8/1948 | Rasmussen | 208—251 |
| 3,751,507 | 8/1973 | Walker | 208—263 |
| 3,330,778 | 7/1967 | Irvin | 252—414 |

DELBERT E. GANTZ, Primary Examiner

J. M. NELSON, Assistant Examiner

U.S. Cl. X.R.

208—252, 253; 252—414, 415

UNITED STATES PATENT OFFICE
CERTIFICATE OF CORRECTION

Patent No. 3,791,968          Dated February 12, 1974

Inventor(s) DARRELL D. WHITEHURST, STEPHEN A. BUTTER AND PAUL G. RODEWALD

It is certified that error appears in the above-identified patent and that said Letters Patent are hereby corrected as shown below:

Column 2, line 53        "non-seelctive" should be --non-selective--.

Table 5 Footnote f.      "efficiency" should be --efficiently--.

Table 6 - Note a.        "24$/1,000" should be --24#/1,000.

Signed and sealed this 23rd day of July 1974.

(SEAL)
Attest:

McCOY M. GIBSON, JR.              C. MARSHALL DANN
Attesting Officer                 Commissioner of Patents